US011921467B2

(12) United States Patent
Seki et al.

(10) Patent No.: US 11,921,467 B2
(45) Date of Patent: Mar. 5, 2024

(54) WATCH

(71) Applicant: Seiko Epson Corporation, Toyko (JP)

(72) Inventors: Shigeaki Seki, Matsumoto (JP); Yutaka Yamazaki, Okaya (JP); Atsushi Miyazaki, Suwa (JP); Toshiya Usuda, Ina (JP)

(73) Assignee: SEIKO EPSON CORPORATION (JP)

( * ) Notice: Subject to any disclaimer, the term of this patent is extended or adjusted under 35 U.S.C. 154(b) by 544 days.

(21) Appl. No.: 17/161,715

(22) Filed: Jan. 29, 2021

(65) Prior Publication Data

US 2021/0240139 A1 Aug. 5, 2021

(30) Foreign Application Priority Data

Jan. 30, 2020 (JP) ................................. 2020-013241

(51) Int. Cl.
*G04C 3/08* (2006.01)
*G04C 3/00* (2006.01)

(52) U.S. Cl.
CPC ............... *G04C 3/08* (2013.01); *G04C 3/008* (2013.01)

(58) Field of Classification Search
CPC ........... G04C 3/08; G04C 3/008; G04C 3/101
See application file for complete search history.

(56) References Cited

U.S. PATENT DOCUMENTS 3,802,179 A * 4/1974 Oki ........................ G04C 3/101 368/80
3,902,312 A * 9/1975 Yamazaki ................ G04G 3/04 968/878
4,110,655 A * 8/1978 Hata ........................ G04F 5/063 310/344
4,362,961 A * 12/1982 Gerber ..................... H03H 3/02 29/25.35
6,097,257 A 8/2000 Kadowaki et al.
10,274,899 B2 * 4/2019 Bonnet .................... G04G 3/04
2014/0086026 A1 * 3/2014 Mitani ................... G04R 60/02 368/278
2015/0316895 A1 * 11/2015 Bonnet .................... G04G 3/04 368/76

FOREIGN PATENT DOCUMENTS

| | | |
|---|---|---|
| JP | S51-044369 A | 4/1976 |
| JP | S51-044369 U | 4/1976 |
| JP | S57-095703 A | 6/1982 |
| JP | 2001-141848 A | 5/2001 |
| JP | 2001-313529 A | 11/2001 |
| JP | 2002-111006 A | 4/2002 |
| JP | 2005-291866 A | 10/2005 |
| JP | 2006-047234 A | 2/2006 |

* cited by examiner

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

A watch includes a crystal oscillator, a controller including an oscillation circuit configured to cause the crystal oscillator to oscillate, wiring that couples the crystal oscillator with the controller, and the crystal oscillator, a storage container that stores the crystal oscillator, the wiring, and the controller, and an outer case that stores the storage container, in which the crystal oscillator and the controller are placed side by side inside the storage container in plan view.

8 Claims, 6 Drawing Sheets

WATCH

The present application is based on, and claims priority from JP Application Serial Number 2020-013241, filed Jan. 30, 2020, the disclosure of which is hereby incorporated by reference herein in its entirety.

BACKGROUND

1. Technical Field

The present disclosure relates to a watch.

2. Related Art

There is disclosed, in JP 2001-141848 A, a watch configured to cause an IC and a crystal oscillator provided at a rotation controller to adjust a rotation period of an indicator needle.

In the watch of JP 2001-141848 A, the IC and the crystal oscillator are driven to cause the crystal oscillator to oscillate. Further, the rotation period of the indicator needle is made adjustable with high accuracy based on an oscillation frequency of the crystal oscillator.

In the watch of JP 2001-141848 A, oscillation characteristics of the crystal oscillator are affected by fluctuations in wiring parasitic capacitance of wiring that couples the crystal oscillator with the IC. For example, in the watch of JP 2001-141848 A, the crystal oscillator is disposed separate from the IC, where the crystal oscillator is electrically coupled to the IC via the wiring. Note that parasitic capacitance occurs in the wiring. The parasitic capacitance of the wiring fluctuates due to environmental factors such as individual differences, temperature, and humidity, and variations in the parasitic capacitance exert an influence on the oscillation characteristics of the crystal oscillator. This raises an issue of degrading the accuracy of the rotation period of the indicator needle. Accordingly, there has been a desire for a watch that reduces the fluctuations in wiring parasitic capacitance of the wiring that couples the crystal oscillator with the IC, improving the time accuracy.

SUMMARY

A watch of the present disclosure includes a controller including an oscillation circuit configured to cause the crystal oscillator to oscillate, wiring configured to couple the crystal oscillator with the controller, a storage container configured to store the crystal oscillator, the wiring, and the controller, and an outer case configured to store the storage container, in which the crystal oscillator and the controller are placed side by side inside the storage container in plan view.

DESCRIPTION OF EXEMPLARY EMBODIMENTS

Embodiments

Hereinafter, a watch 1 of one embodiment of the present disclosure will be described with reference to the drawings.

Figure 1:
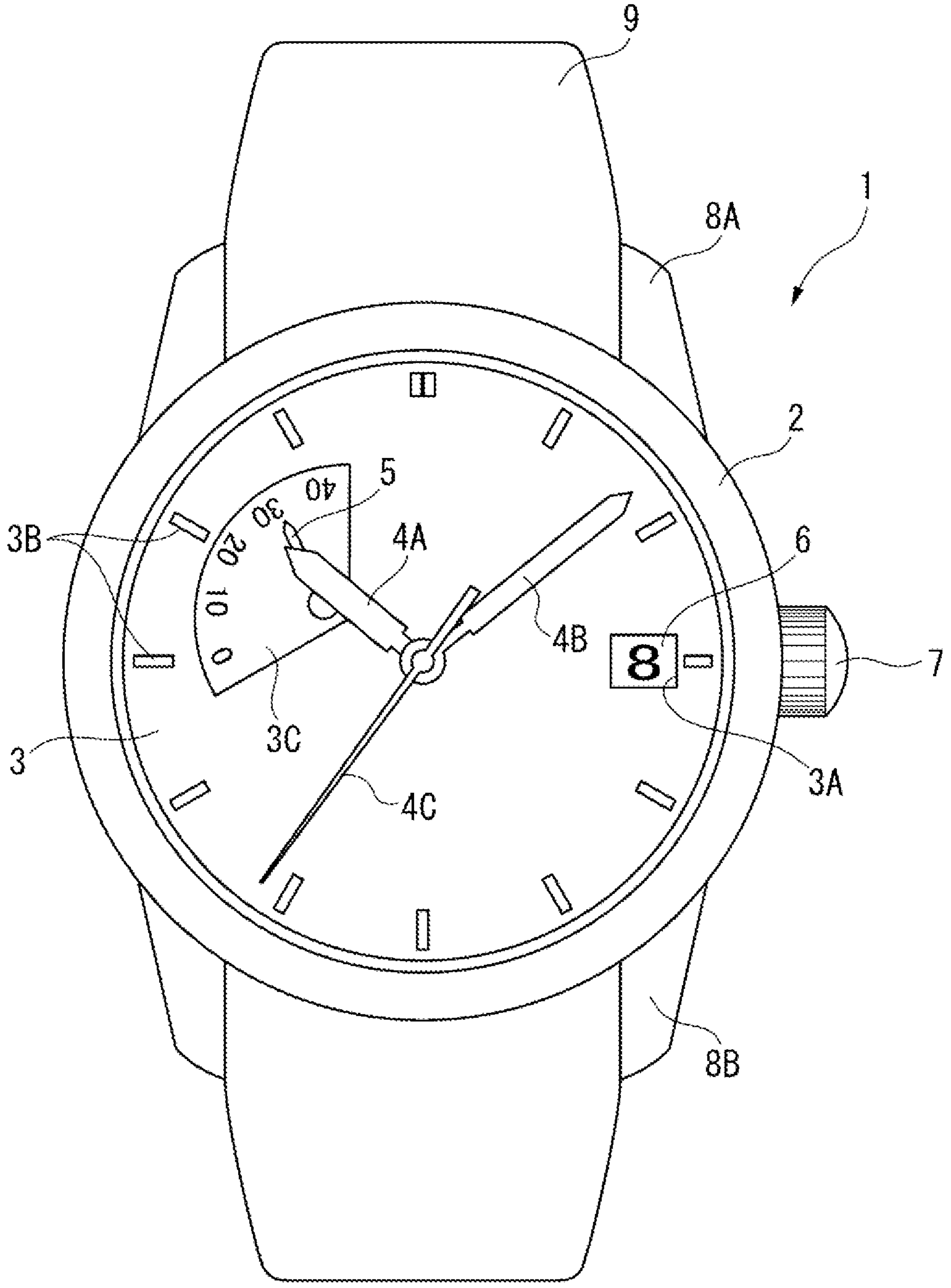
FIG. 1 is a front view illustrating a watch of one embodiment.

FIG. 1 is a front view illustrating the watch 1. In the embodiment, the watch 1 is configured as an electronically controlled mechanical watch.

As illustrated in FIG. 1, the watch 1, which is a watch worn on a wrist of a user, includes an outer case 2 of a cylindrical shape, where a dial 3 is disposed on an inner circumferential side of the outer case 2. Of two openings of the outer case 2, the opening on a side of a front face is sealed by cover glass, and the opening on the side of a back face is sealed by a case back.

The watch 1 includes a movement 150 (see FIG. 2) housed inside the outer case 2, and an hour hand 4A, a minute hand 4B, and a seconds hand 4C that indicate clock time information. The dial 3 is provided with a calendar small window 3A through which a date indicator 6 is made visible. The dial 3 is also provided with an hour mark 3B for indicating clock time, and a subdial 3C of a fan shape for indicating a duration time with a power reserve hand 5.

A first attachment section 8A is provided at a side face on a 12 o'clock side of the outer case 2, and a second attachment section 8B is provided at a side face on a 6 o'clock side. Further, one end of a watch band 9 is attached to the first attachment section 8A, and the other end of the watch band 9 is attached to the second attachment section 8B. That is, in the embodiment, the watch band 9 is attached to the side faces on the 12 o'clock and 6 o'clock sides of the outer case 2.

Further, a crown 7 is provided at a side face on a 3 o'clock side of the outer case 2. The crown 7 is configured to be pulled out to be moved from a zeroth step position at which the crown 7 is pressed toward a center of the watch 1 to a first step position and a second step position.

The crown 7 is pulled out to the first step position and is then turned to make the date adjustable by moving the date indicator 6. The crown 7 is pulled out to the second step position to stop the seconds hand 4C, and the crown 7 is turned at the second step position, then the hour hand 4A and the minute hand 4B are moved to make the clock time adjustable. How the date indicator 6, the hour hand 4A, and the minute hand 4B are corrected using the crown 7 is the same as in a known watch, and thus descriptions of this method will be omitted.

Also, a tuning of the crown 7 at the zeroth step position enables a mainspring 41 described below to be wound up. The power reserve hand 5 then moves interlocked with the winding up of the mainspring 41. As for the watch 1 of the embodiment, a duration time of approximate 40 hours can be secured when the mainspring 41 is fully wound up.

Movement

Figure 2:
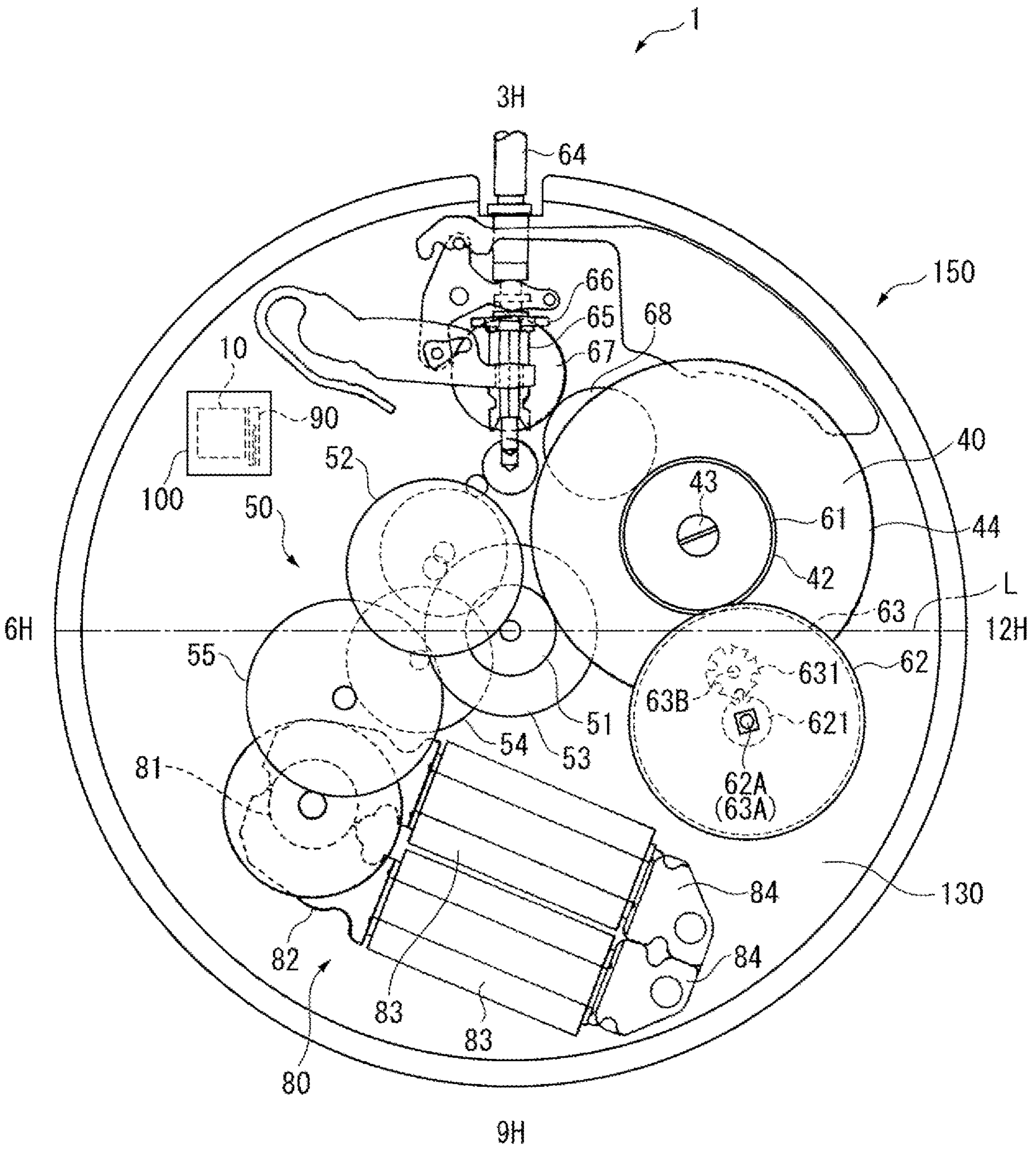
FIG. 2 is a plan view illustrating a main part of a movement of a watch.

FIG. 2 is a plan view illustrating a main part of the movement 150.

The movement 150 includes a barrel complete 40, a ratchet wheel 61, a ratchet transmission wheel 62, a barrel transmission wheel 63, a train wheel 50, and a storage container 100.

The barrel complete 40 includes the mainspring 41 (FIG. a transmission gear 42, a barrel arbor 43, and a barrel gear 44.

The mainspring 41, an outer end of which is fixed to the barrel gear 44 and an inner end of which is fixed to the barrel arbor 43, is housed in the barrel complete 40.

The transmission gear 42, which is formed smaller in diameter dimension than the barrel gear 44, meshes with the barrel transmission wheel 63.

The barrel arbor 43, which is axially supported by a main plate 130 and a non-illustrated train wheel bridge, is configured rotatable with respect to the transmission gear 42 and the barrel gear 44. That is, a rotation of the barrel arbor 43 allows the mainspring 41 to be wound up, and the mainspring 41 wound up to be released to rotationally drive the barrel gear 44.

The barrel gear 44 meshes with the train wheel 50 that is rotationally driven when the mainspring 41 is released.

The ratchet wheel 61 is formed in the same diameter as the transmission gear 42, and is fixed to the barrel arbor 43. The ratchet wheel 61 is rotated by a winding mechanism of the mainspring 41, and meshes with a non-illustrated clasp. The clasp serves as a stopper that meshes with the ratchet wheel 61 to restrict the ratchet wheel 61 from rotating in an unwinding direction of the mainspring 41. The winding mechanism includes a winding stem 64, a clutch wheel 65, a winding pinion 66, a crown wheel 67, and an intermediate ratchet wheel 68.

The crown 7 is then tuned to allow the winding stem 64 to rotate, then causing the ratchet wheel 61 to rotate via the clutch wheel 65, the winding pinion 66, the crown wheel 67, and the intermediate ratchet wheel 68. The rotation of the ratchet wheel 61 allows the barrel arbor 43 to rotate, then causing the mainspring 41 to be wound up.

Further, a rotation of the barrel gear 44 that is rotationally driven by the unwinding of the mainspring 41 is increased in speed via the train wheel 50 that is a speed increasing train wheel constituted by a second wheel 51, a third wheel 52, overlapping the second wheel 51, that meshes with the second wheel 51, a fourth wheel 53 that meshes with the third wheel 52, a fifth wheel 54 that meshes with the fourth wheel 53, a sixth wheel 55 that meshes with the fifth wheel 54. The rotation is then transmitted to a rotor 81 of a generator 80.

The minute hand 4B is attached to a non-illustrated cannon pinion integrated with the second wheel 51, and the hour hand 4A is attached to an hour wheel to which a rotation is transmitted via a minute wheel from the cannon pinion. The seconds hand 4C is attached to a shaft tip of the fourth wheel 53. Moreover, a rotation of the sixth wheel 55 that rotates at the highest speed is transmitted to the rotor 81 of the generator 80.

The generator 80 includes the rotor 81, a stator 82 at which the rotor 81 is rotatably disposed, and a coil 83 wound around a part of the stator 82.

The stator 82 includes a pair of stator main bodies 84 in which the rotor 81 is disposed at one end side. Further, the coil 83 is wound around each of the stator main bodies 84.

Electrical energy generated from the generator 80 is supplied to an IC 10 and a crystal oscillator 90 that will be described later. The IC 10 is configured to cause the coil 83 of the generator 80 to be short-circuited to generate a brake force, thus performing rotation control of the rotor 81 and speed control of the train wheel 50.

The ratchet transmission wheel 62 includes a rotation shaft 62A that is integrally formed with the ratchet transmission wheel 62. The rotation shaft 62A is supported, via a bearing, by a non-illustrated rotating weight receiver. The ratchet transmission wheel 62 meshes with the ratchet wheel 61.

The rotation shaft 62A is integrally formed with a drive wheel 621. Note that the drive wheel 621 may be formed separately from the ratchet transmission wheel 62 and fixed in a state anti-rotated with respect to the rotation shaft 62A.

The ratchet transmission wheel 62 is configured to rotate when the ratchet wheel 61 rotates at the time when the mainspring 41 is wound up, and in conjunction with this, the drive wheel 621 is configured to rotate integrally with the ratchet transmission wheel 62 about the rotation shaft 62A.

The barrel transmission wheel 63 is rotatably and axially supported by a rotation shaft 63A provided coaxially with the rotation shaft 62A of the ratchet transmission wheel 62, and meshes with the transmission gear 42 of the barrel complete 40. The barrel transmission wheel 63 is also integrally provided with a protruding shaft 63B that protrudes toward the ratchet transmission wheel 62.

A driven wheel 631 that meshes with the drive wheel 621 is rotatably and axially supported by the protruding shaft 63B. That is, the drive wheel 621 and the driven wheel 631 are provided between the barrel transmission wheel 63 and the ratchet transmission wheel 62.

Storage Container

Figure 3:
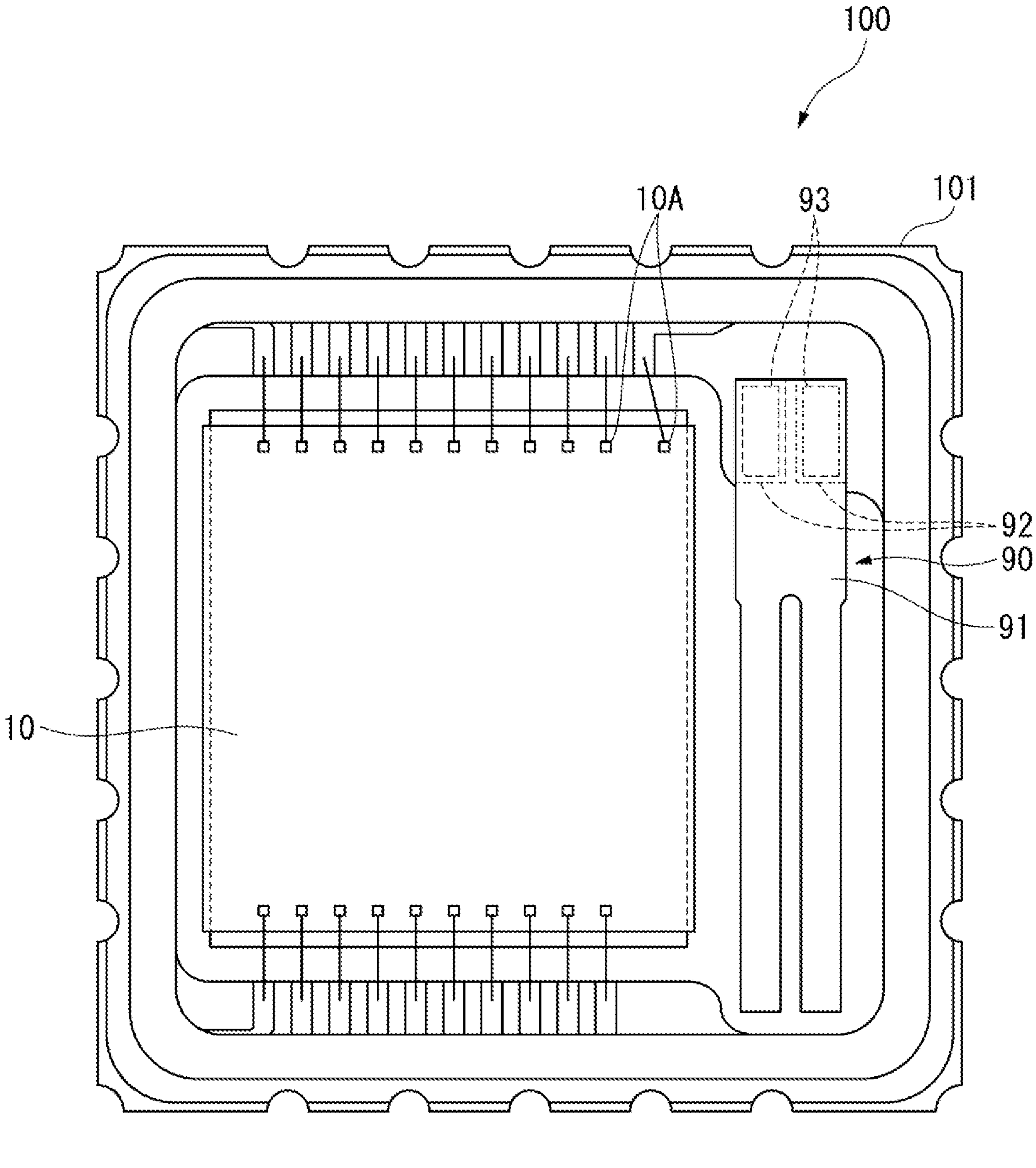
FIG. 3 is a plan view illustrating a main part of a storage container.
Figure 4:
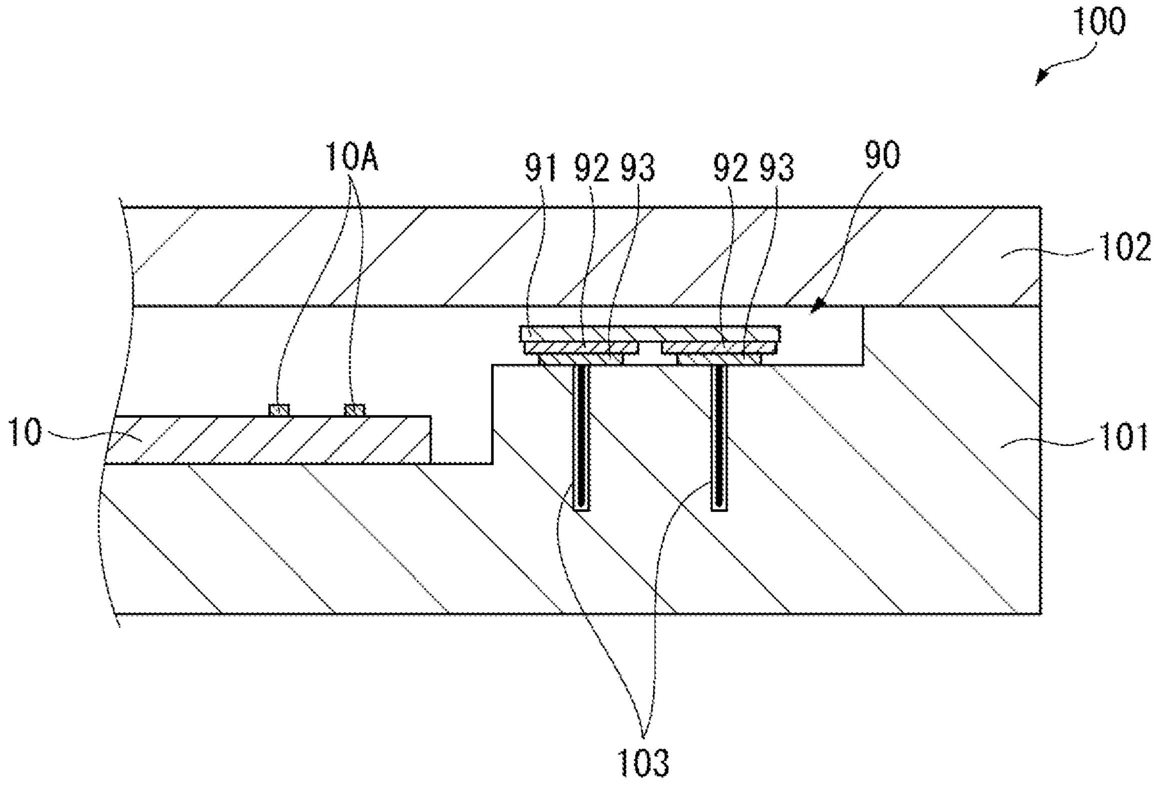
FIG. 4 is an enlarged cross-sectional view illustrating a main part of a storage container.

FIG. 3 is a plan view illustrating a main part of the storage container 100, and FIG. 4 is an enlarged cross-sectional view illustrating the main part of the storage container 100. Note that, in the embodiment, cases when viewed from a direction orthogonal to the dial 3 will be described as when viewed in plan view. Also, in FIG. 4, thicknesses of the IC 10, an IC electrode 10A, a crystal oscillator main body 91, a crystal oscillator electrode 92, a fixation portion 93, and the like are exaggerated to make these components easily recognizable.

As illustrated in FIGS. 2 to 4, the storage container 100 is disposed at a non-illustrated circuit board, and is formed in a box shape including a storage container main body 101 and a storage container lid portion 102. In the embodiment, a bottom portion of the storage container main body 101 is constituted by a multilayer substrate.

Also, in the embodiment, an interior of the storage container 100 is sealed, where inside the sealed interior, the crystal oscillator 90 and the IC 10 are provided side by side when viewed in plan view. This makes it possible to arrange the IC 10 and the crystal oscillator 90 in a manner close to each other, and to reduce fluctuations in wiring parasitic capacitance compared to a configuration in which a crystal oscillator and an IC are placed separately and coupled to each other via wiring, as in the related art. Note that the IC 10 is an example of the controller of the present disclosure.

The IC 10 is electrically coupled to the crystal oscillator 90. Specifically, the IC 10 includes the IC electrode 10A that is coupled to the crystal oscillator 90. In addition, the crystal oscillator 90 includes the crystal oscillator main body 91, the crystal oscillator electrode 92 that couples the crystal oscillator main body 91 with the IC 10, and the fixation portion 93. Further, the IC electrode 10A is coupled, via wiring 103, to the crystal oscillator electrode 92. Note that, in the embodiment, the wiring 103 is constituted by a wire bonding, through hole, and wiring pattern. Specifically, the wiring 103 disposed on a surface side of the IC 10 is constituted by the wire bonding, and the wiring 103 disposed inside the bottom portion of the storage container main body 101 is constituted by the through-hole and wiring pattern. Note that the IC electrode 10A is an example of the controller electrode of the present disclosure.

Here, in the embodiment, the IC electrode 10A and the crystal oscillator electrode 92 are placed adjacent to each other in plan view. This makes it possible to shorten the wiring 103 that couples the IC electrode 10A with the crystal oscillator electrode 92. This thus reduces fluctuations in wiring parasitic capacitance of the wiring 103, thus stabilizing oscillation characteristics of the crystal oscillator 90. Also, the crystal oscillator 90 and the IC 10 are arranged side by side (provided side by side) when viewed in plan view, thus contributing to the thinning.

Disposition of Crystal Oscillator

As illustrated in FIGS. 3 and 4, the crystal oscillator includes the crystal oscillator main body 91 fixed, at the fixation portion 93 provided on a side of one end portion in a longitudinal direction of the crystal oscillator 90, to the bottom portion of the storage container main body 101. That is, the crystal oscillator 90 is cantilevered by the storage container main body 101. In the embodiment, the fixation portion 93 is composed of an electrically conductive adhesive. Note that the fixation portion 93 is not limited to the above-described configuration, and may be composed of metallized pattern, solder, or the like, for example.

Further, in the embodiment, the crystal oscillator 90 is disposed such that the longitudinal direction of the crystal oscillator 90 intersects an imaginary line L connecting the 12 o'clock side and the 6 o'clock side of the watch 1, that is, the imaginary line L connecting the first attachment section 8A and the second attachment section 8B, as illustrated in FIG. 2. Specifically, the crystal oscillator 90 is disposed so as to be orthogonal in the longitudinal direction to the imaginary line L.

Here, if the watch 1 is mistakenly dropped, a side face of the outer case 2 may face downward and collide with the ground or the like. At this time, when the outer case 2 is dropped with the side face on the 12 o'clock side or the side face on the 6 o'clock side of the outer case 2 facing downward, the watch band 9 is attached, via the attachment sections 8A and 8B, to the side faces on the 12 o'clock and the 6 o'clock sides of the outer case 2, as described above. Accordingly, the watch band 9, which collides with the ground or the like in this case, mitigates an impact of the drop.

On the other hand, when the outer case 2 is dropped with the side face on the 3 o'clock side or a side face on the 9 o'clock side of the outer case 2 facing downward, the impact of the drop, which is not mitigated by the watch band 9, increases. That is, in this case, a large stress is generated along a line segment connecting the 3 o'clock side and the 9 o'clock side of the watch 1.

At this time, supposing that the crystal oscillator 90 is disposed such that the longitudinal direction is parallel to the imaginary line L, the longitudinal direction of the crystal oscillator 90 becomes orthogonal to a direction in which the above-described stress is exerted. Then, the crystal oscillator 90 includes the crystal oscillator main body 91 cantilevered at the fixation portion 93 on the side of the one end portion in the longitudinal direction of the crystal oscillator 90 as described above, thus, a large moment is to be exerted, by the stress, on the fixation portion 93. This makes the fixation portion 93 easily damaged.

In contrast, in the embodiment, the crystal oscillator 90 is disposed such that the longitudinal direction is orthogonal to the imaginary line L, as described above. That is, in the crystal oscillator 90, the longitudinal direction is parallel to the direction in which the above-described stress is exerted. This makes it possible to suppress a large moment from being exerted, by the stress, on the fixation portion 93, thus improving the durability against the moment.

Schematic Configuration of Watch

Figure 5:
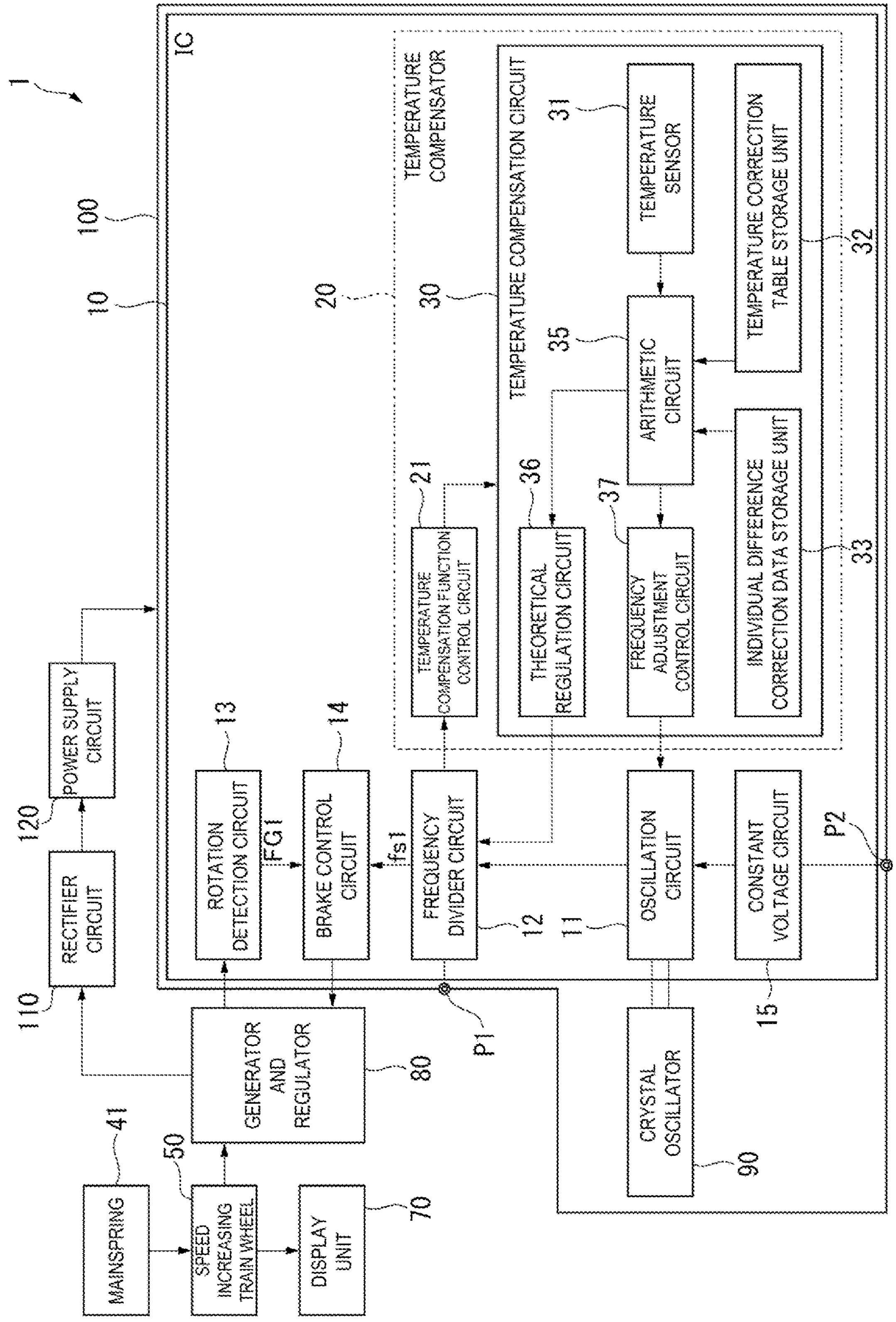
FIG. 5 is a block diagram illustrating a schematic configuration of a watch.

FIG. 5 is a block diagram illustrating a schematic configuration of the watch 1.

As illustrated in FIG. 5, the watch 1 includes the storage container 100, the IC 10, the mainspring 41, the train wheel 50, a display unit 70, the generator 80, the crystal oscillator 90, a rectifier circuit 110, and a power supply circuit 120. Note that, in the embodiment, the watch 1 is configured to be a so-called year difference timepiece with accuracy measured in seconds per year.

The crystal oscillator 90 is driven by an oscillation circuit 11 that will be described later to generate an oscillation signal.

As described above, the train wheel 50 couples the mainspring 41 with the rotor 81 of the generator 80 illustrated in FIG. 2. Moreover, the train wheel 50 couples the rotor 81, and the hands 4A to 4C, and 5 illustrated in FIG. 1. This allows the mainspring 41 to drive, via the train wheel 50, the hands 4A to 4C, and 5.

The display unit 70 includes the hands 4A to 4C illustrated in FIG. 1, and is configured to indicate the clock time. The display unit 70 also includes the power reserve hand 5.

The rectifier circuit 110, which is configured by a boost rectifier, full-wave rectifier, half-wave rectifier, transistor rectifier, or the like, boosts and rectifies an AC output from the generator 80 to supply power charging of the power supply circuit 120.

IC

The IC 10 includes the oscillation circuit 11, a frequency divider circuit 12, a rotation detection circuit 13, a brake control circuit 14, a constant voltage circuit 15, and a temperature compensator 20. Note that the IC is an abbreviation for the term "Integrated Circuit".

The oscillation circuit 11 is driven, when a voltage of the power supply circuit 120 reaches high value, to cause the crystal oscillator 90 to oscillate, which is a source of the oscillation signal. The oscillation circuit 11 is then configured to output the oscillation signal (32768 Hz) from the crystal oscillator 90 to the frequency divider circuit 12 constituted by a flip-flop.

The frequency divider circuit 12 is configured to frequency-divide the oscillation signal to generate a clock signal at a plurality of frequencies (for example, 2 kHz to 8 Hz), and outputs the clock signal that is necessary to the brake control circuit 14 and the temperature compensator 20. Here, the clock signal output from the frequency divider circuit 12 to the brake control circuit 14 is a reference signal fs1 that serves as a reference for a rotation control of the rotor 81, as described later. The frequency divider circuit 12 is coupled with a first terminal P1. The first terminal P1 is provided exposed to an outer surface of the storage container 100. This makes it possible to output the reference signal fs1 output from the frequency divider circuit 12, via the first terminal P1, to the outside.

The rotation detection circuit 13 is constituted by a non-illustrated waveform shaping circuit and monostable multivibrator that are coupled to the generator 80, and outputs a rotation detection signal FG1 representing a rotational frequency of the rotor 81 of the generator 80.

The brake control circuit 14 is configured to compare the rotation detection signal FG1 output from the rotation detection circuit 13 with the reference signal fs1 output from the frequency divider circuit 12, and outputs a brake control signal for regulating the generator 80 to a non-illustrated brake circuit. Note that the reference signal fs1 is a signal that corresponds to a reference rotational speed (for example, 8 Hz) of the rotor 81 during normal operation of the movement. Thus, the brake control circuit 14 is configured to change a duty ratio of the brake control signal in accordance with a difference between a rotation speed (the rotation detection signal FG1) of the rotor 81 and the reference signal fs1, controls the brake circuit to adjust the brake force, and controls a motion of the rotor 81.

The constant voltage circuit 15 is a circuit that is configured to convert an external voltage supplied from the power supply circuit 120 into a fixed voltage and to supply the fixed voltage. In the embodiment, the constant voltage circuit 15 is configured to drive the oscillation circuit 11 and the frequency divider circuit 12 with a constant voltage. The constant voltage circuit 15 is also coupled with the second terminal P2. The second terminal P2 is provided exposed to the outer surface of the storage container 100, as in the first terminal P1 described above. This makes it possible to monitor a drive voltage of the constant voltage circuit 15, via the second terminal P2, from the outside of the storage container 100.

Temperature Compensator

The temperature compensator 20 is configured to compensate for temperature characteristics of the crystal oscillator 90 and the like to suppress fluctuations in an oscillation frequency, and includes a temperature compensation function control circuit 21, and a temperature compensation circuit 30.

The temperature compensation function control circuit 21 is configured to operate the temperature compensation circuit at a predetermined timing.

The temperature compensation circuit 30 includes a temperature sensor 31 that is a temperature measuring unit, a temperature correction table storage unit 32, an individual difference correction data storage unit 33, an arithmetic circuit 35, a theoretical regulation circuit 36, and a frequency adjustment control circuit 37.

The temperature sensor 31 is configured to input, into the arithmetic circuit 35, an output corresponding to the temperature of an environment in which the watch 1 is being used. A device using a diode, or using an CR oscillation circuit, may be used as the temperature sensor 31, where the current temperature is detected by an output signal that varies according to temperature characteristics of the diode or the CR oscillation circuit. In the embodiment, an CR oscillation circuit is used as the temperature sensor 31, which is configured to output a signal that, after wave shaping, can be immediately processed by digital signal processing. That is, a frequency of the signal output from the CR oscillation circuit varies according to an environmental temperature, where a temperature can be detected based on the frequency of the output signal. In addition, when the CR oscillation circuit is configured to be driven with a constant current, the drive current of the temperature sensor 31 being determined by a value of the constant current, a current value can be controlled by design, to easily achieve a low current consumption. A constant current driven CR oscillation circuit, which is configured to be driven with a low voltage and low current consumption, is well suited as the temperature sensor 31 in the watch 1 having a temperature compensation function.

The temperature correction table storage unit 32 is configured to store a temperature correction table setting how much the rate should be adjusted at a particular temperature assuming an ideal crystal oscillator 90 and an ideal temperature sensor 31. That is, the temperature correction table storage unit 32 is configured to store temperature correction data common for the crystal oscillator 90 and the temperature sensor 31. Note that the temperature correction table is an example of the temperature correction data of the present disclosure.

Also, individual differences due to manufacturing variations occur in the crystal oscillator 90 and the temperature sensor 31. Examples of the individual differences include a secondary coefficient of temperature characteristics of the crystal oscillator 90, an apex temperature of the crystal oscillator 90, an apex rate of the crystal oscillator 90, an output frequency of the temperature sensor 31, and a load capacity of the oscillation circuit 11, for example. Under such a circumstance, individual difference correction data setting how much the individual differences may be corrected based on the characteristics of the crystal oscillator 90 and the characteristics of the temperature sensor 31 measured beforehand in manufacturing or inspection process, are written to the individual difference correction data storage unit 33. Note that, in the embodiment, an operation for compensating the individual differences in the crystal oscillator 90 and the temperature sensors 31 that are described above in a temperature compensation function operation is referred to as individual difference temperature compensation operation.

The temperature correction table storage unit 32 utilizes a mask ROM. The mask ROM, which is the simplest type among semiconductor memories, is utilized to increase the integration degree, reducing the area.

The individual difference correction data storage unit 33 is constituted by a non-volatile memory, where a FAMOS is specifically used. This is because the FAMOS is configured to write data with a relatively low voltage among non-volatile memories, and because of the low current value after the writing.

The arithmetic circuit 35 is configured to calculate a correction amount of the rate using the measured temperature from the temperature sensor 31, the temperature correction data table stored in the temperature correction table storage unit 32, and the individual difference correction data stored in the individual difference correction data storage unit 33. The arithmetic circuit 35 is then configured to output a result of the calculation to the theoretical regulation circuit 36 and the frequency adjustment control circuit 37.

The theoretical regulation circuit 36 is a circuit that is configured to input a set or reset signal at a predetermined timing to each of frequency division stages of the frequency divider circuit 12, to digitally increase and decrease the period of the reference signal fs1. For example, provided that a period of the reference signal fs1 is shortened by approximately 30.5 μsec (1/32768 Hz) once in 10 seconds, the clock signal period is shortened 8640 times per one day, and then the signal change becomes faster by 8640×30.5 μsec=0.264 sec. In other words, the clock time is advanced each day by 0.264 sec/day. Note that the sec/day (s/d) represents the rate, and indicates the time shift per day.

As described above, the frequency adjustment control circuit 37 is a circuit that is configured to adjust the oscillation frequency per se of the oscillation circuit 11 by adjusting an additional capacitance of the oscillation circuit 11. The oscillation circuit 11 is configured to delay the clock time because the oscillation frequency decreases when the additional capacitance increases. Conversely, the oscillation circuit 11 is configured to advance the clock time because the oscillation frequency increases when the additional capacitance decreases.

As such, in the embodiment, the theoretical regulation circuit 36 and the frequency adjustment control circuit 37 are combined to adjust the rate.

First Terminal and Second Terminal

Next, a method for monitoring the oscillation characteristics by the first terminal P1 and the second terminal P2 will be described.

As described above, the IC 10 is configured to output the reference signal fs1 output from the frequency divider circuit 12, via the first terminal P1, to the outside. This makes it possible to monitor, while gradually reducing a power supply voltage of the power supply circuit 120, the reference signal fs1 output from the frequency divider circuit 12, to thus monitor an oscillation stop voltage of the IC 10.

This also makes it possible to monitor, via the second terminal P2 from the outside of the storage container 100, the drive voltage of the constant voltage circuit 15 configured to drive the oscillation circuit 11 and the frequency divider circuit 12, as described above.

This makes it possible to monitor an oscillation margin of the IC 10, that is, oscillation characteristics of the IC 10, by subtracting the oscillation stop voltage of the IC 10 from the drive voltage of the constant voltage circuit 15.

As such, in the embodiment, it is possible to monitor the oscillation characteristics without coupling the wiring for monitoring the oscillation characteristics of the crystal oscillator 90 to the wiring that couples the crystal oscillator with the oscillation circuit 11.

Note that a form is typical in which wiring for inspecting the oscillation characteristics of a crystal oscillator is coupled between the wirings that couple the crystal oscillator 90 with the oscillation circuit 11, however, in the present disclosure, an inspection wiring is not coupled to the wiring that couples the crystal oscillator 90 with the oscillation circuit 11. As described above, the first terminal P1 coupled to the frequency divider circuit 12 can be used to inspect overall characteristics of the crystal oscillator 90 and the oscillation circuit 11, the second terminal P2 coupled to the constant voltage circuit 15 can be used to inspect single characteristics of the oscillation circuit 11. Further, the inspection results of the first terminal P1 and the second terminal P2 can also be used to inspect the single characteristics of the crystal oscillator 90. As such, the provision of the inspection terminals enables to shorten a total wiring length between the crystal oscillator 90 and the oscillation circuit 11, and to reduce an influence of the parasitic capacitance, compared to a known technology.

Advantageous Functions and Effects of Embodiments

According to the embodiment, the following advantageous effects can be achieved.

The watch 1 of the embodiment includes the crystal oscillator 90, the IC 10 including the oscillation circuit 11 configured to cause the crystal oscillator 90 to oscillate, the wiring 103 that couples the crystal oscillator 90 with the IC the storage container 100 that stores the crystal oscillator the wiring 103, and the IC 10, and the outer case 2 that stores the storage container 100. Further, the crystal oscillator 90 and the IC 10 are provided side by side when viewed in plan view.

This makes it possible to shorten the wiring 103 that couples the crystal oscillator 90 with the IC 10, thus reducing the fluctuations in wiring parasitic capacitance of the wiring 103. This thus stabilizes the oscillation characteristics of the crystal oscillator 90, thus improving the time accuracy.

Moreover, the crystal oscillator 90 and the IC 10 are provided side by side when viewed in plan view, thus, a thickness of the storage container 100 can be reduced compared to when the crystal oscillator 90 and the IC 10 are arranged overlapping each other. This thus achieves thinning of the watch 1.

In the embodiment, the IC 10 includes the IC electrode 10A to be coupled to the crystal oscillator 90, where the crystal oscillator 90 includes the crystal oscillator electrode 92 to be coupled to the IC 10. Further, the IC electrode 10A and the crystal oscillator electrode 92 are placed adjacent to each other in plan view.

This makes it possible to shorten a distance between the IC electrode 10A and the crystal oscillator electrode 92, thus shortening the wiring 103 that couples the crystal oscillator 90 with the IC 10. This thus stabilizes the oscillation characteristics of the crystal oscillator 90, thus improving the time accuracy.

In the embodiment, the storage container 100 is provided with the first terminal P1 to be coupled to the frequency divider circuit 12, and the second terminal P2 to be coupled to the constant voltage circuit 15.

This makes it possible to monitor the oscillation characteristics without coupling the wiring for monitoring the oscillation characteristics to the wiring that couples the crystal oscillator 90 with the oscillation circuit 11. This thus reduces fluctuations in wiring parasitic capacitance of the crystal oscillator 90, improving the time accuracy.

In the embodiment, the crystal oscillator 90 is disposed such that the longitudinal direction intersects the imaginary line L connecting the first attachment section 8A and the second attachment section 8B.

This makes it possible to improve the durability against the moment exerted, by an impact when dropping, on the fixation portion 93 of the crystal oscillator 90.

Modified Examples

Note that the present disclosure is not limited to the embodiments described above, and variations, modifications, and the like within the scope in which the object of the present disclosure can be achieved are included in the present disclosure.

In the above-described embodiments, the crystal oscillator 90 is disposed such that, but not limited to, the longitudinal direction is orthogonal to the imaginary line L. For example, the crystal oscillator 90 may be disposed such that an angle formed by the imaginary line L and the longitudinal direction is from 60 degrees to 120 degrees.

This makes it possible to reduce the moment exerted on the fixation portion 93 by the stress generated when the outer case 2 is dropped with the side face on the 3 o'clock side or the side face on the 9 o'clock side of the outer case 2 facing downward. Specifically, the moment exerted on the fixation portion 93 can be half or less compared to when the crystal oscillator 90 is disposed such that the longitudinal direction becomes parallel to the imaginary line L, to thus improve the durability against an impact generated when the watch 1 is dropped, for example.

In the above-described embodiments, the watch 1 includes, but not limited to, one piece of the mainspring 41, and may include two pieces of mainspring, for example.

In the above-described embodiments, the watch 1 is configured as, but not limited to, an electronically controlled mechanical watch including the generator 80 and the train wheel 50. For example, the watch 1 may be configured as an analogue quarts watch equipped with a battery, a motor, a crystal oscillator, and the like, or a digital quartz watch equipped with a digital display unit. In this case, the battery may be configured as a secondary battery, or may include a power generation mechanism such as a solar cell for charging the secondary battery. The battery may also have a hand position detection function, a radio wave receiving function, a communication function, and the like.

In the above-described embodiments, the wiring 103 that couples the crystal oscillator 90 with the IC 10 is constituted by, but not limited to, the wire bonding, through hole, and wiring pattern.

Figure 6:
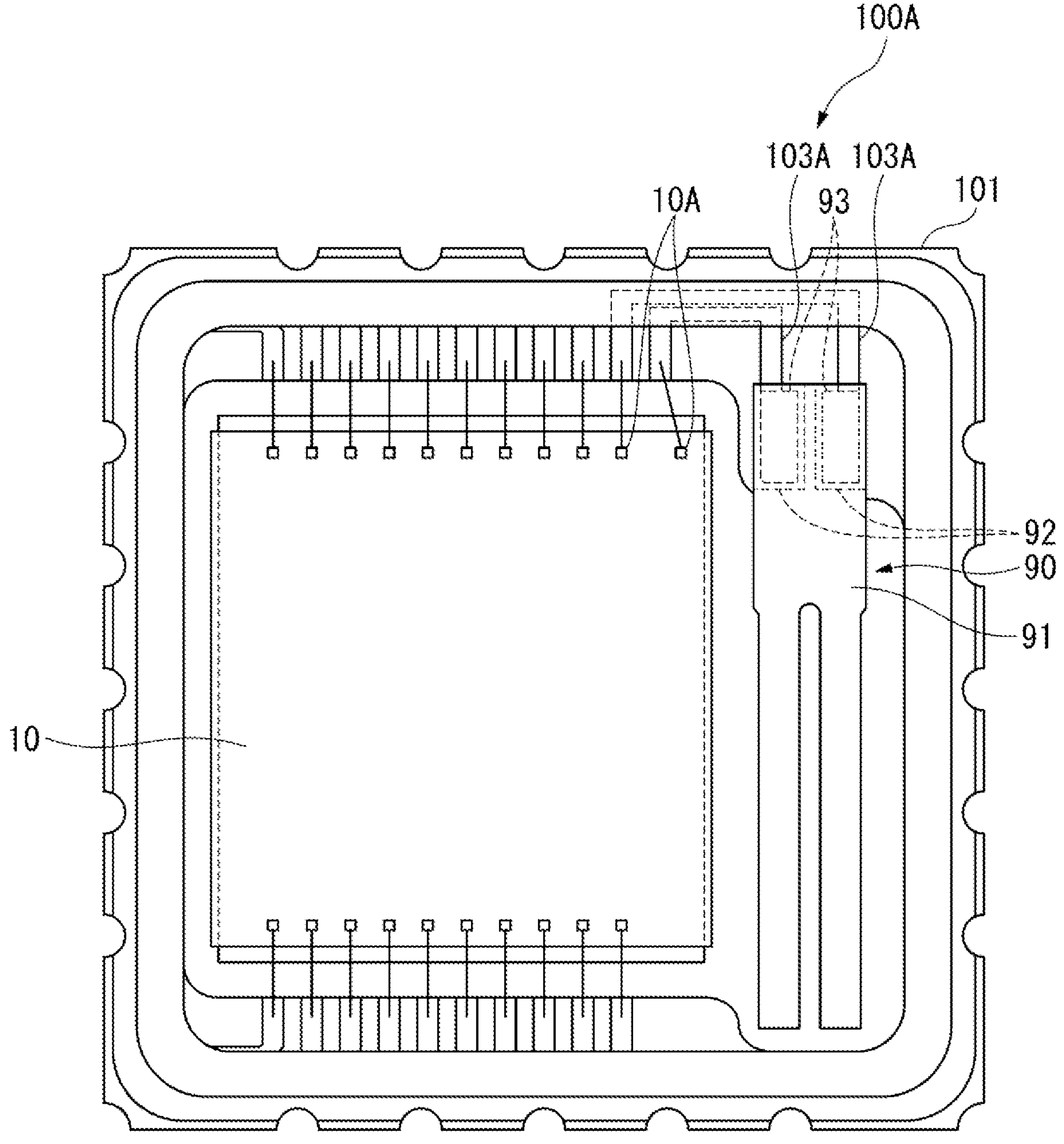
FIG. 6 is a plan view illustrating a main part of a storage container of a modified example.

FIG. 6 is a plan view illustrating a storage container 100A of a modified example. As illustrated in FIG. 6, the crystal oscillator 90 may be coupled to the IC 10 via wiring 103A that is constituted by the wire bonding and wiring pattern.

In the above-described embodiments, the temperature compensation circuit 30 includes, but not limited to, the temperature correction table storage unit 32 and the individual difference correction data storage unit 33. For example, the temperature compensation circuit 30 may include either one of the temperature correction table storage unit 32 or the individual difference correction data storage unit 33. Also, cases where the temperature compensation circuit 30 is not provided are included in the present disclosure.

In the above-described embodiments, the temperature compensation circuit 30 is configured, but not limited to, to adjust the rate combining the theoretical regulation circuit 36 and the frequency adjustment control circuit 37. For example, the temperature compensation circuit 30 may be configured to adjust the rate with either one of the theoretical regulation circuit 36 or the frequency adjustment control circuit 37.

In the above-described embodiments, the temperature correction table storage unit 32 is constituted by the mask ROM, and the individual difference correction data storage unit 33 is constituted by the FAMOS, and without being limited to this, these units may be appropriately set in implementation.

In the above-described embodiments, the constant voltage circuit 15 is configured to drive the oscillation circuit 11 and the frequency divider circuit 12, and without being limited to this, a target driven by the constant voltage circuit 15 may be set as appropriate in implementation.

In the above-described embodiments, the watch 1 includes the crystal oscillator 90, and without being limited to this, the watch 1 may include an AT oscillator or a MEMS oscillator, for example.

Summary of Present Disclosure

A watch of the present disclosure includes a crystal oscillator, a controller including an oscillation circuit configured to cause the crystal oscillator to oscillate, wiring that configured to couple the crystal oscillator with the controller, a storage container configured to store the crystal oscillator, the wiring, and the controller, and an outer case configured to store the storage container, in which, in plan view, the crystal oscillator and the controller are placed side by side inside the storage container.

This makes it possible to shorten the wiring that couples the crystal oscillator with the controller, thus reducing fluctuations in wiring parasitic capacitance of the wiring. This thus stabilizes oscillation characteristics of the crystal oscillator, thus improving the time accuracy.

Moreover, the crystal oscillator and the controller are placed side by side in plan view, thus, a thickness of the storage container can be reduced compared to when the crystal oscillator and the controller are arranged overlapping each other. This thus achieves thinning of the watch.

In the watch of the present disclosure, the controller may include a controller electrode coupled to the crystal oscillator, the crystal oscillator may include a crystal oscillator electrode coupled to the controller, and the controller electrode and the crystal oscillator electrode may be placed adjacent to each other in plan view.

This makes it possible to shorten a distance between the controller electrode and the crystal oscillator electrode, thus shortening the wiring that couples the crystal oscillator with the controller. This thus stabilizes oscillation characteristics of the crystal oscillator, improving the time accuracy.

In the watch of the present disclosure, the controller may include a frequency divider circuit configured to frequency-divide an oscillation signal output from the oscillation circuit to output a reference signal, and a constant voltage circuit, in which the storage container may be provided with a first terminal coupled to the frequency divider circuit, and a second terminal coupled to the constant voltage circuit.

This makes it possible to monitor the oscillation characteristics without coupling the wiring for monitoring the oscillation characteristics with the crystal oscillator. This thus reduces fluctuations in wiring parasitic capacitance of the crystal oscillator, improving the time accuracy.

A watch band attached to the The watch of the present disclosure may include a watch band attached to the outer case, in which the outer case may be provided with a first attachment portion to which one end portion of the watch band is attached, and a second attachment portion to which another end portion is attached, and the crystal oscillator may be disposed such that a longitudinal direction of the crystal oscillator intersects an imaginary line connecting the first attachment portion and the second attachment portion.

This makes it possible to improve the durability against the moment exerted, by an impact when dropping, on a fixation portion of the crystal oscillator.

In the watch of the present disclosure, the crystal oscillator may be disposed such that an angle formed by the imaginary line and the longitudinal direction is from 60 degrees to 120 degrees.

This makes it possible to allow the moment exerted on the fixation portion of the crystal oscillator to be half or less, thus improving the durability.

What is claimed is:

1. A watch comprising:

a crystal oscillator;

a controller including an oscillation circuit configured to cause the crystal oscillator to oscillate;

wiring configured to couple the crystal oscillator with the controller;

a storage container configured to store the crystal oscillator, the wiring, and the controller; and an outer case configured to store the storage container, wherein in a plan view, the crystal oscillator and the controller are placed side by side inside the storage container, the controller includes a frequency divider circuit configured to frequency-divide an oscillation signal output from the oscillation circuit to output a reference signal, and a constant voltage circuit, and the storage container is provided with a first terminal coupled to the frequency divider circuit, and a second terminal coupled to the constant voltage circuit.

2. The watch according to claim 1, wherein the controller includes a controller electrode coupled to the crystal oscillator, the crystal oscillator includes a crystal oscillator electrode coupled to the controller, and the controller electrode and the crystal oscillator electrode are placed adjacent to each other in the plan view.

3. The watch according to claim 2, comprising a watch band attached to the outer case, wherein the outer case is provided with:

a first attachment portion to which one end portion of the watch band is attached; and a second attachment portion to which another end portion of the watch band is attached, and the crystal oscillator is disposed such that a longitudinal direction of the crystal oscillator intersects an imaginary line connecting the first attachment portion and the second attachment portion.

4. The watch according to claim 3, wherein the crystal oscillator is disposed such that an angle formed by the imaginary line and the longitudinal direction is from 60 degrees to 120 degrees.

5. The watch according to claim 1, comprising a watch band attached to the outer case, wherein the outer case is provided with:

a first attachment portion to which one end portion of the watch band is attached; and a second attachment portion to which another end portion of the watch band is attached, and the crystal oscillator is disposed such that a longitudinal direction of the crystal oscillator intersects an imaginary line connecting the first attachment portion and the second attachment portion.

6. The watch according to claim 5, wherein the crystal oscillator is disposed such that an angle formed by the imaginary line and the longitudinal direction is from 60 degrees to 120 degrees.

7. A watch comprising:

a crystal oscillator;

a controller including an oscillation circuit configured to cause the crystal oscillator to oscillate;

wiring configured to couple the crystal oscillator with the controller;

a storage container configured to store the crystal oscillator, the wiring, and the controller;

an outer case configured to store the storage container; and a watch band attached to the outer case, wherein in a plan view, the crystal oscillator and the controller are placed side by side inside the storage container, the outer case is provided with:

a first attachment portion to which one end portion of the watch band is attached; and a second attachment portion to which another end portion of the watch band is attached, the crystal oscillator is disposed such that a longitudinal direction of the crystal oscillator intersects an imaginary line connecting the first attachment portion and the second attachment portion, and the crystal oscillator is disposed such that an angle formed by the imaginary line and the longitudinal direction is from 60 degrees to 120 degrees.

8. The watch according to claim 7, wherein the controller includes a controller electrode coupled to the crystal oscillator, the crystal oscillator includes a crystal oscillator electrode coupled to the controller, and the controller electrode and the crystal oscillator electrode are placed adjacent to each other in the plan view.

* * * * *